United States Patent [19]
Branick

[11] 3,771,580
[45] Nov. 13, 1973

[54] EARTH MOVER TIRE BEAD BREAKER

[76] Inventor: Charles Earl Branick, 1601 S. 9th St., Fargo, N. Dak. 58102

[22] Filed: Aug. 21, 1972

[21] Appl. No.: 282,114

[52] U.S. Cl. ............................................. 157/1.17
[51] Int. Cl. ............................................ B60c 25/06
[58] Field of Search .................... 157/1.17, 1.1, 1.33

[56] References Cited
UNITED STATES PATENTS
2,822,863  2/1958  Regnault ........................... 157/1.17
2,679,896  6/1954  Branick ............................. 157/1.17
3,707,179  12/1972  Le Pier ............................. 157/1.17

*Primary Examiner*—Granville Y. Custer, Jr.
*Assistant Examiner*—Harold P. Smith, Jr.
*Attorney*—Duane Burton

[57] ABSTRACT

Apparatus includes elongate breaker unit having bead breaking feet at one end and pivot mounting at other end. A compression link is pivoted at its aft end to the pivot mounting. A clamp link and an intermediate portion slidably crossing an intermediate portion of the breaker unit to form a triangular linkage. An anchor foot extends from the first end of the clamp link to engage a wheel rim inner face, and extensible means connected to the second end of the clamp link forcibly engages the breaker unit to shorten the base of the triangle and drive the bead breaking feet toward the anchor foot and in between a tire side wall and the wheel rim flange. A drive means on the breaker unit pushes one of the bead breaking feet forward away from the other feet to force the tire side wall and bead away from the rim flange.

14 Claims, 7 Drawing Figures

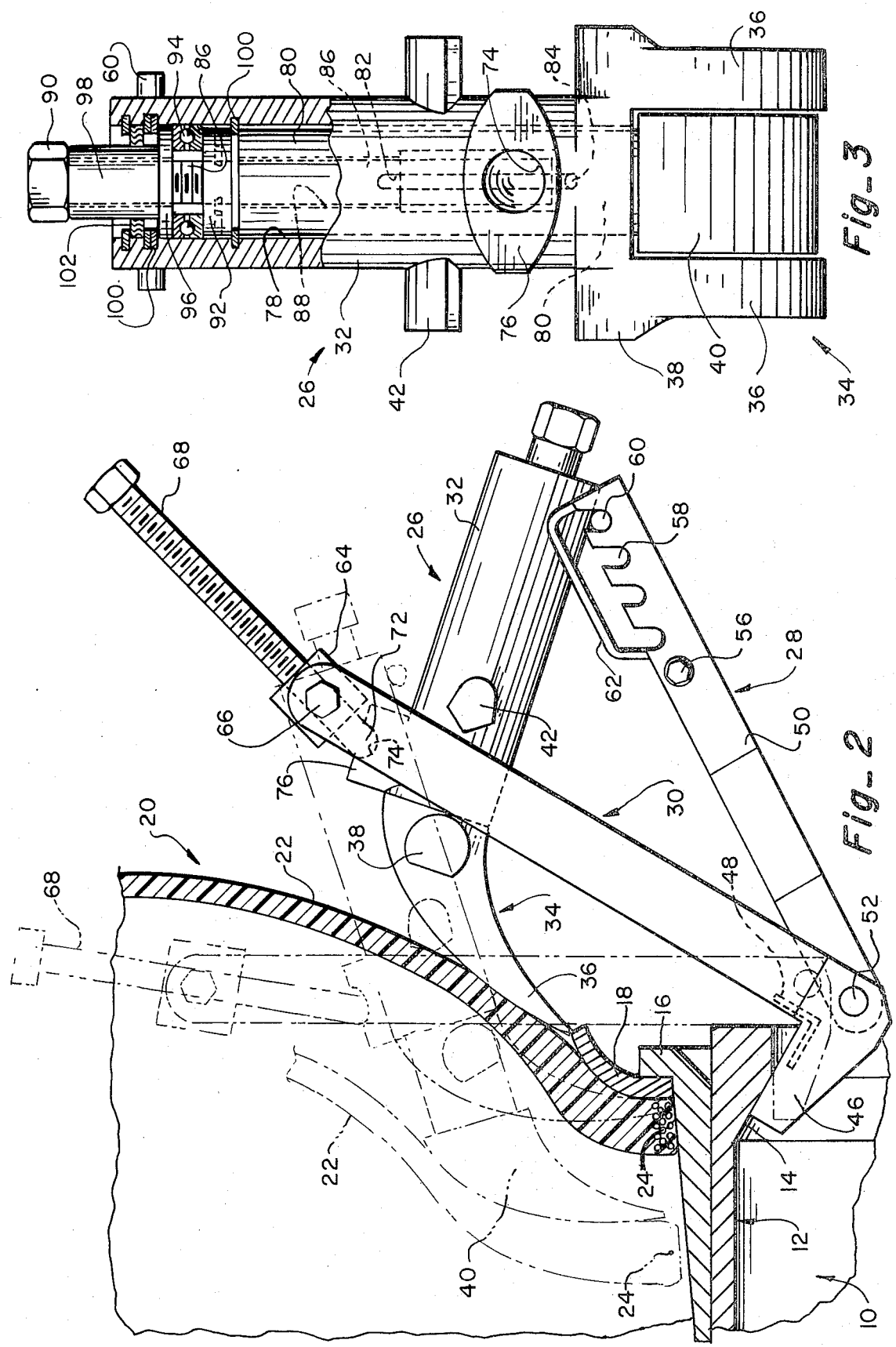

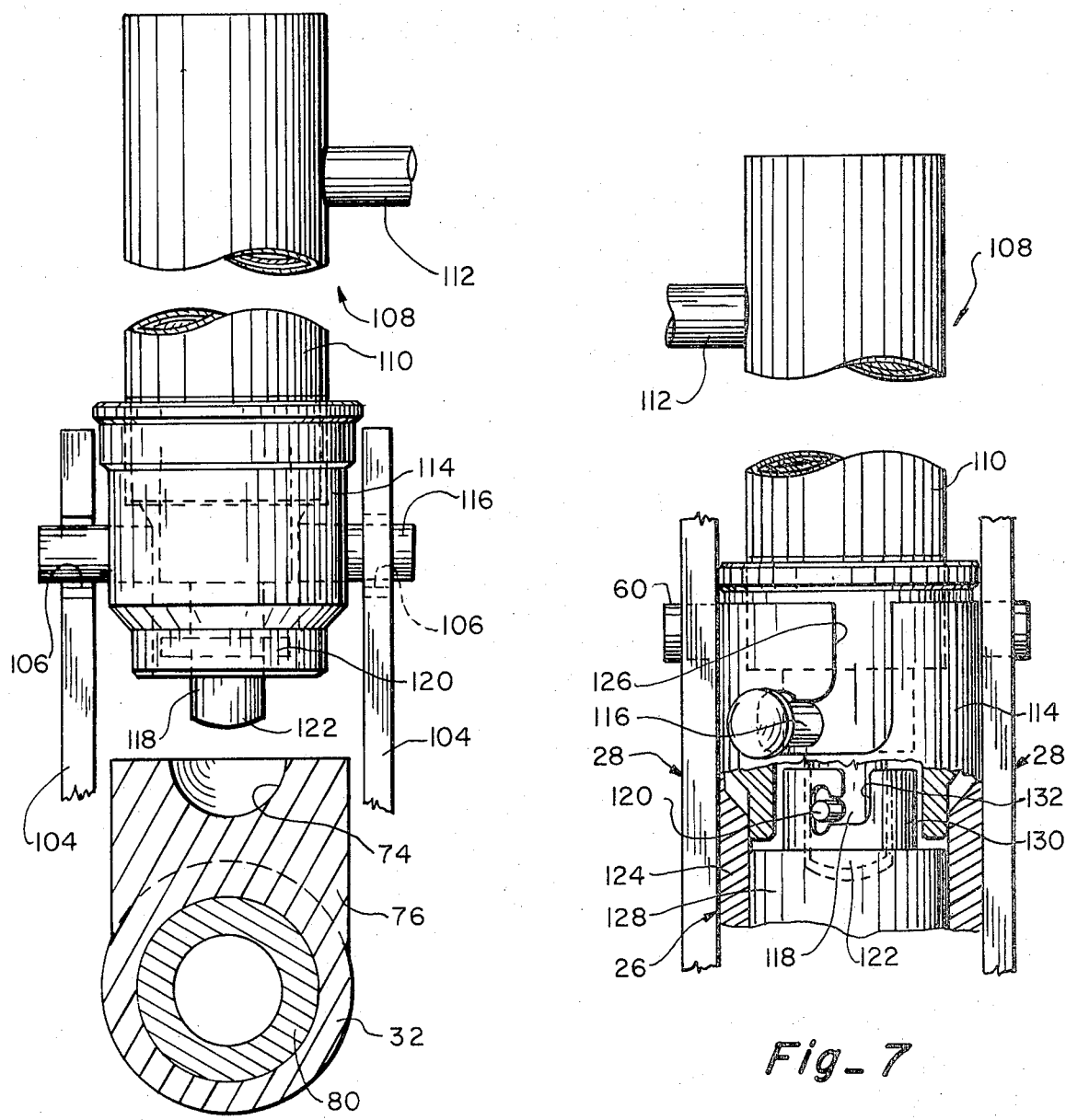
Fig_6
Fig_7

EARTH MOVER TIRE BEAD BREAKER

BACKGROUND OF THE INVENTION

As is well known in the art, it is common practice to remove a pneumatic tire from its supporting wheel by apparatus available at tire service stations, the wheel being dismounted or removed from the vehicle and secured in such apparatus after which the tire bead is broken away from the wheel side flanges by a movable member or foot which engages the tire adjacent the bead. Such apparatus is not only bulky and expensive but lacks portability. Moreover, it is not applicable for use when a wheel remains affixed to a vehicle.

To obviate the disadvantages just referred to, easily portable and inexpensive bead breakers have been devised so that a motorist or a farmer, for example, is enabled to effect a tire change or repair at a remote location without resort to use of apparatus of the relatively non-portable type first referred to. Preferably such a portable device should also be effective to break the beads on a tire without removing the wheel from the vehicle since removal is often unnecessary, for example, in the replacement or repair of an inner tube employed with a drop center wheel. In such operation, both beads are separated from the rim flanges and moved into the drop center channel after which one bead may be moved over a rim flange providing access to the interior of the tire for removing or replacing the tube. This presents another difficulty when the wheel remains on the vehicle since its suspension, such as an axle housing, presents an obstruction for bead breaking apparatus, which obstruction is not present at the outer bead.

Many devices have been proposed and built for the purposes described above but they have not been entirely satisfactory because of one disadvantage or another. One type utilizes a breaker foot which must be rotated about the periphery of the rim. While this tool loosens the outer exposed bead fairly well, it cannot be used on the inner bead because of the obstruction presented by the axle housing. Another type operates on individual portions of the bead, forcing them away sequentially. It is actuated by various levers, some of which are close to the axis of the wheel in some positions. Again, this device works fairly well on the outer bead but is seriously hampered by the axle housing when applied to the inner bead.

Still another type utilizes a plurality of breaker feet which are inserted between the tire side wall and the rim flange, and an axially extensible power tool pushes one of the feet away from the others to separate a local portion of the bead from the rim flange. The power tool extends almost parallel to the wheel axis from a point adjacent to the rim flange and thus avoids the problem of obstruction by the axle housing. However, it has two serious disadvantages, particularly when it is attempted to use it on massive equipment like earth movers. It has no built in means to force the breaker feet between the tire side wall and the rim flange, so they must be pounded into position with a hammer. The wheels and tires are so large and the beads are so firmly seated that this becomes an exercise in futility. Even if they are finally positioned, there is nothing on the tool to hold them in place and, when the one breaker foot is driven away from the others, the entire set frequently slips out without having accomplished its purposes. This is not only ineffective but also extremely dangerous because the loosened tool moves with great force.

SUMMARY OF THE INVENTION

The present invention overcomes the difficulties mentioned above and provides apparatus which is relatively simple in construction and use and which can be applied to any earth mover wheel and tire combination. It grips the rim firmly for safety and certainty of action and is applied in such manner that it is not hampered by any vehicle structure.

Generally stated, the apparatus is made up of three main components, a breaker unit, a compression link, and a clamp link. The breaker unit is elongate and includes a main body having three or more bead breaking feet at its forward end which extend laterally from the axis of the main body and terminate in a generally transverse plane. At least one backup foot is fixedly secured to the main body and at least one pusher foot is movably carried by the body to be extended forward against the tire side wall. Drive means on the body provides the force for moving the pusher foot. The main body carries a pivot mounting at or near its aft end.

A compression link is connected at its aft end to the pivot mounting and at its forward end is pivotally connected to a first end of a clamp link, the intermediate portion of which slidably crosses the intermediate portion of the breaker unit so that the three components form a triangular linkage. An anchor foot extends laterally from the first end of the clamp link in a direction to engage the inner face of the rim in operative position. Drive means at the second end of the clamp link is extensible to engage the breaker unit, forcing it to swing around the pivot mounting which shortens the base of the triangle and moves the breaking feet toward the anchor foot. The free edges of the breaking feet are positioned along the juncture between the tire side wall and the rim flange so that their movement toward the anchor foot forces them to enter between the side wall and the rim flange.

When the breaking feet are firmly seated in position the drive means on the main body is actuated to force the pusher foot forward away from the backup foot. Since the latter is forcibly engaged with the rim flange, the pusher foot forces a local portion of the side wall and bead inward away from the rim flange to a sufficient extent to unseat the bead portion. While the apparatus may be left in this position and another similar device applied at a suitable peripheral distance, it is preferred to remove the apparatus and re-apply it at fairly uniform spacing around the periphery to break away the bead of the tire from its seat.

BRIEF DESCRIPTION OF THE DRAWING

Various other advantages and features of novelty will become apparent as the description proceeds in conjunction with the accompanying drawings, in which:

FIG. 2 is a schematic side elevational view corresponding to FIG. 1;

FIG. 3 is a schematic top plan view of the breaker unit;

FIG. 6 is a schematic view in elevation and partly in section of a modified drive means on the clamp link; and FIG. 7 is a schematic view in elevation and partly in section of a modified drive means applied to the breaker unit.

DESCRIPTION OF PREFERRED EMBODIMENTS

Figure 1:
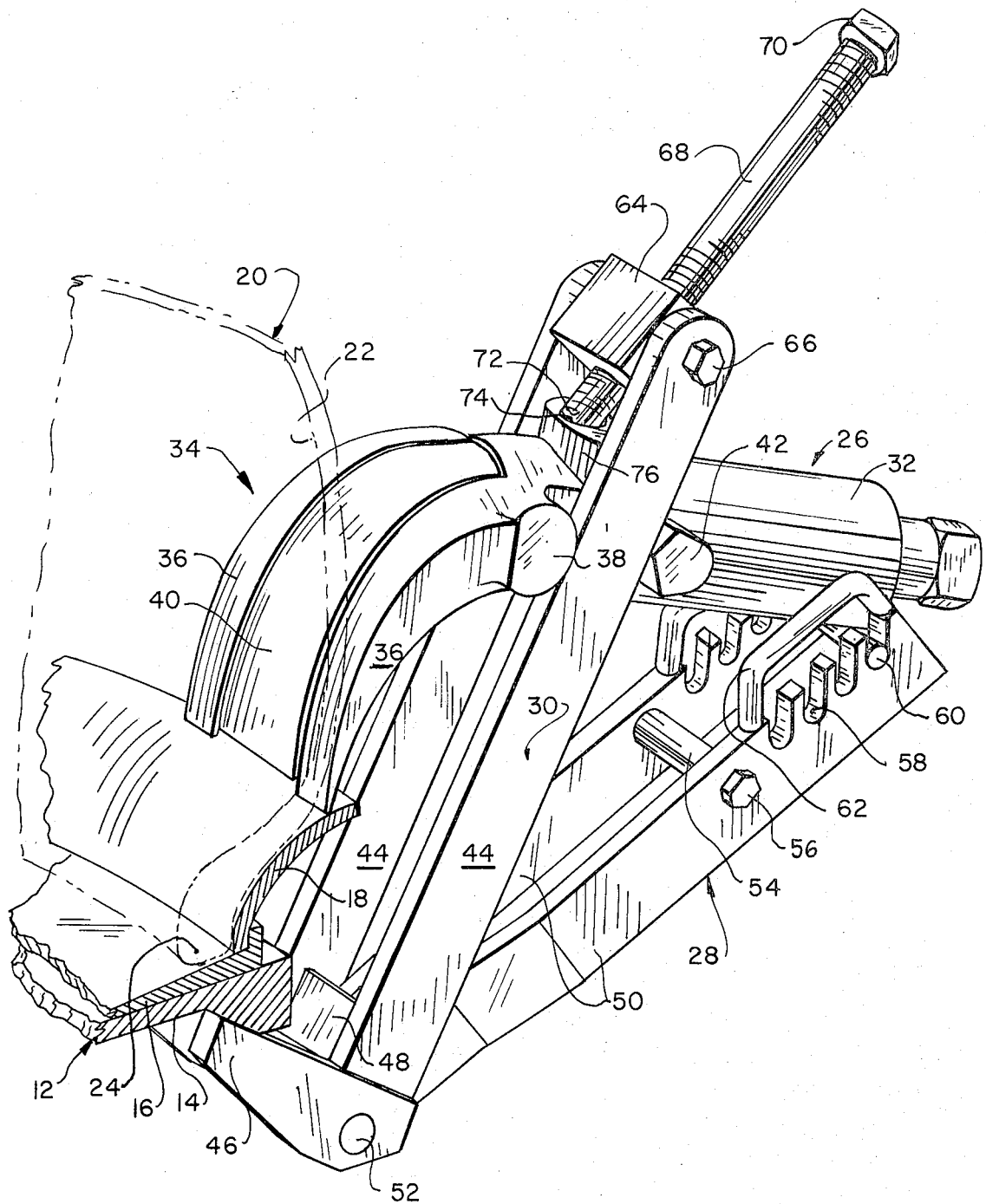
FIG. 1 is a schematic view in perspective of the apparatus applied to a fragmentary section of a wheel and tire.

A tire bead breaking apparatus for earth mover tire units constructed in accordance with the principles of the present invention is illustrated schematically in operative relation to a tire and wheel rim in FIGS. 1, 2, 4, and 5, in which portions of a wheel 10 include a wheel drum 12 having a rim inner face 14, a bead seat ring 16, and a tire side ring or rim flange 18. A tire 20 has a side wall 22 seating against the rim flange 18 and a bead 24 secured by hoop tension on bead seat ring 16.

The three main components of the bead breaking apparatus are an elongate breaker unit 26, an elongate compression link 28, and an elongate clamp link 30. The breaker unit includes a main body 32 having a plurality of bead breaking feet 34 at its forward end, all of the feet being formed as elongate curved wedges of the same general contour extending laterally from the axis of the main body and terminating in a generally transverse plane so that their free ends may be applied as a chisel-like formation to the juncture between side wall 22 and rim flange 18. In the preferred form the feet 34 include a pair of backup feet 36 which are fixedly secured and preferably integral with opposite sides of the forward end of the main body to define a gap between them, their aft ends being shaped to define guide bosses 38. A pusher foot 40 is freely mounted in the gap and slidably connected to the main body by a carrier member described in detail hereinafter for slidable movement forward of the plane the backup feet. A second pair of guide bosses 42 are located one on each side of the main body and axially spaced from bosses 38 for a purpose to be described.

Clamp link 30 is made up of a pair of laterally spaced bars 44, each being formed at its first end with a laterally extending anchor foot 46 to engage the rim inner face 14, and the bars are held in their proper relation by an angle brace 48 welded at its ends to the respective bars. The intermediate portion of the link slidably crosses the intermediate portion of the main body and is maintained in a desired relation by the fore and aft guide bosses 38 and 42.

The apparatus is completed by compression link 28 which is made up of two bars 50 pivotally connected at their first ends to the clamp link by pivot pins 52. A tubular cross brace 54 extends between the bars at an intermediate point and is held in position by bolts 56. The second end of each bar 50 is formed with a plurality of notches or recesses 58 opening toward breaker unit 26 and adapted to selectively receive a rod 60 which is welded to the main body in the vicinity of its aft end and extends laterally to each side of the body to an extent sufficient to seat in one of the recesses 58 and serve as a pivot means or mounting. A guard member 62 overlies the recesses in spaced relation to prevent inadvertent separation of the two components. Rod 60 is seated in the proper recess to conform to the size of the wheel and tire which are to be processed. It will be seen that the three components define a triangular linkage with the base 30 of the triangle adapted to be shortened in operation.

When the apparatus is applied to a wheel and tire combination as indicated in FIG. 1 and in FIG. 2 in solid lines, the bead breaking feet 34 are in opposition to the anchor foot 46 in the nature of the jaws of a clamp, and feet 34 are at the juncture of the tire side wall and the rim flange while the anchor foot underlies the wheel drum in firm contact with the rim inner face 14. At the second, free end of clamp link 30 a clevis block 64 is mounted by means of bolts or pivot pins 66. Drive means in the form of an elongate threaded shaft 68 having a tool engaging head 70 is threaded into the clevis block and is formed with a clamping foot 72 of generally hemispherical form.

Figure 4:
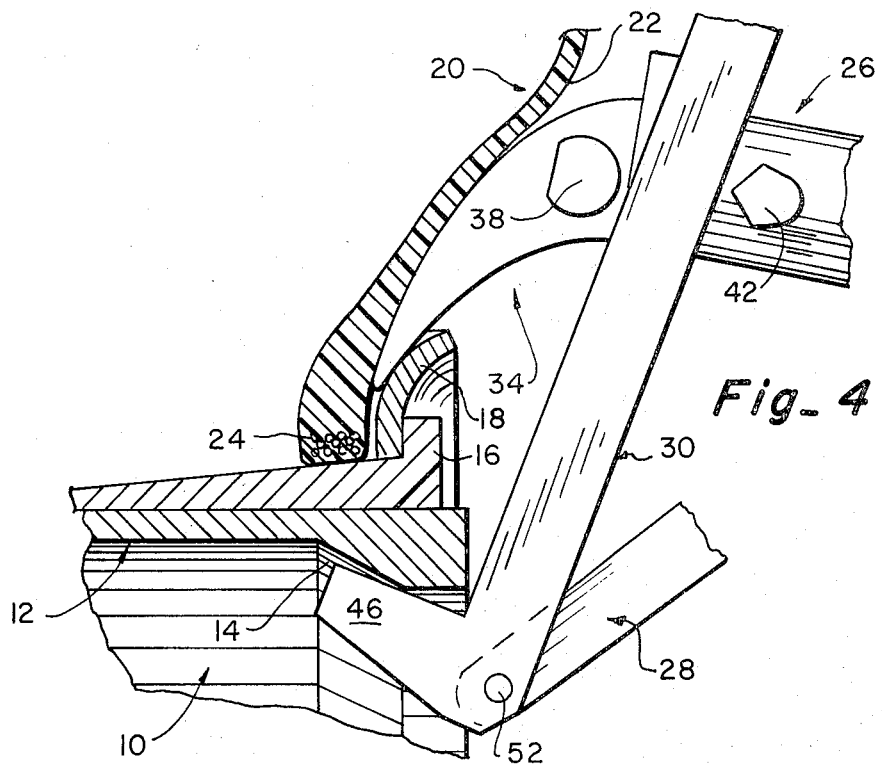
FIG. 4 is a fragmentary schematic view similar to FIG. 2 showing the tool position with the breaker feet partially inserted between the tire and rim flange.

Foot 72 is adapted to engage in a generally hemispherical socket 74 formed in the outer face of pressure pad 76 which may be welded on or formed integral with the main body at the side opposite to the direction of extension of bead breaking feet 34. As shaft 68 is extended, clamping foot 72 exerts pressure on pad 76 and on the breaker unit as a beam, producing pressure on link 28 at 58, 60 and on the free edges of feet 34. Link 28 is subjected to compression and link 30 is subjected to tension as it forces the breaker unit to swing about pivot 60, shortening the base of the triangle and forcing feet 34 toward foot 46 and also causing them to enter between the tire side wall and the rim flange, as indicated in FIG. 4, displacing the side wall substantially and the bead to a slight extent. Link 30 is maintained in its proper relation to the breaker unit because its sliding movement is restrained between bosses 38 and 42.

It will be noted that as the shape of the triangle changes, the clamp link 30 approaches a position substantially parallel to a plane containing the peripheral edge of the rim and the breaker unit swings slightly past a line parallel to the wheel axis. Therefore the parts are in the most desirable clamping attitude and the breaker unit is in the proper attitude for driving the tire bead inwardly off its seat which is normally angled slightly, about five degrees, as shown.

Figure 5:
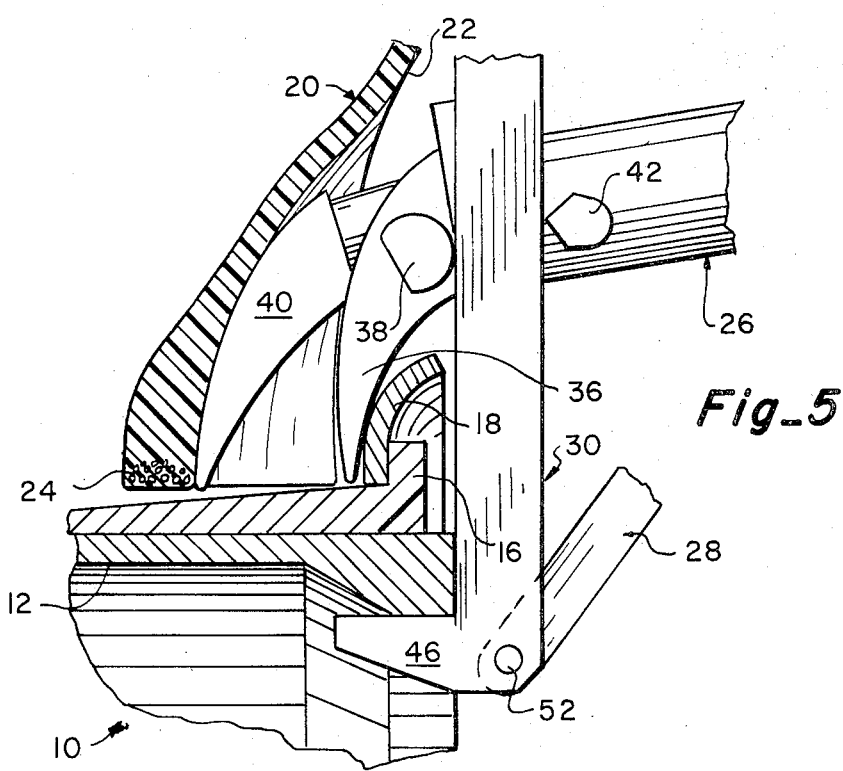
FIG. 5 is a view similar to FIG. 4 showing the feet pressed fully home and with the tire bead forced off its seat by one foot.

While the breaker unit is held firmly in the position of FIG. 5 by the action of the clamp link, backup feet 36 are in forcible engagement with rim flange 18 and pusher foot 40 is extended forward from its position between feet 36 to force a local section of the tire bead 24 inward and off its seat. Since anchor foot 46 is firmly in engagement with the rim inner face there is no possibility of the bead breaking feet slipping out of their intended position during the operation. It will also be noted that substantially the entire apparatus is located radially outward of the rim at all times so that axle housings or other vehicle structure do not interfere with the operation. In some cases after the bead is broken locally the apparatus may be released and moved to a peripherally spaced location.

The details of the drive means for pusher foot 40 are illustrated in FIG. 3. Main body 32 is provided with a straight axial bore 78 from end to end. Foot 40 is mounted on and preferably integral with the forward end of carrier member 80, which is slidable forward in bore 78 from the position shown to extend the pusher foot and break the bead. Slot 82 is formed in the lower side of the carrier member and a guide pin 84 extends into the slot from the lower wall of the main body to prevent rotation of the carrier member and limit its fore and aft movement. The drive means includes a threaded shaft 86 extending into the bore from the aft end and engaging in a cooperating threaded bore 88 in the carrier member. Head 90 on the shaft has tool engaging formations for its rotation.

The mounting of shaft 86 includes a collar nut 92 fixed on the shaft to engage the forward race of thrust bearing 94 which in turn is backed up by flange 96 of shoulder bushing 98. The collar nut, thrust bearing, and flange are held in position by snap rings 100, and a dirt seal 102 is mounted within the aft end of the bore.

While the screw threaded drive means are entirely satisfactory since they may be operated by ratchet wrenches or impact wrenches, it may be desirable in some cases to make use of hydraulic power. FIG. 6 illustrates a hydraulic drive means used with the clamp link. In this case, the second, free ends of clamp link bars 104 are formed with bayonet slots 106. A power pack 108, which may be supplied by a hand pump or power actuated pump, comprises a cylinder 110 having a fitting 112 for connection to a source of supply. The forward end of the cylinder is provided with a generally annular collar 114 from which project a pair of bayonet pins 116 which are engaged with the bayonet slots to produce a clevis type connection. Piston rod 118 is provided with bayonet pins 120 not used in this particular installation and its forward end is formed as a clamping foot 122, or is provided with a separate clamping foot, to engage socket 74 in pressure pad 76. When the bead breaking feet are secured in position, the breaker unit may be held in clamping relation by any suitable latch means, such as a pin passing through bars 104 and overlying the main body. The power pack may then be removed and used to actuate the breaker unit.

In FIG. 7, the same power pack is shown as it may be applied to the breaker unit. In this case the barrel 124 is left open at the aft end, counterbored, and provided with bayonet slots 126 opening inward from the end. The carrier member 128 is longer than the previous carrier member 80 and is formed at its aft end with a hollow, coaxial, rearwardly open boss 130 in which bayonet slots 132 are formed which open inward from the end similarly to slots 126. The two sets of pins are arranged in fore and aft alignment and are inserted and rotated together to lock into the slots. With the arrangement as shown, the piston rod can not only extend the carrier member but retract it as well.

In the power pack system, the clamp link and the breaker unit are simpler structures, and a single power pack may be used to actuate any desired number of devices, thus reducing total cost and complication.

What is claimed is:

1. Tire bead breaking apparatus for use with an earth mover wheel having laterally spaced circular rim portions including exposed peripheral inner faces and peripheral bead seats and radially outwardly extending rim flanges to receive a tire having beads secured on the bead seats and annular side walls seating against the rim flanges, comprising:
   an elongate breaker unit having a main body;
   a plurality of bead breaking feet at the forward end of the main body extending laterally of the axis of the body and terminating in a generally transverse plane, and adapted to engage between the rim flange and the tire side wall and bead;
   pivot means carried by the aft portion of the main body;
   an elongate clamp link having at least one laterally extending anchor foot at a first end to engage a rim inner face, and having an intermediate portion slidably crossing an intermediate portion of the breaker unit;
   and an elongate compression link having a first end pivotally connected to the first end of the clamp link and a second end pivotally connected to the pivot means on the main body;
   the three components being connected and arranged to form a triangular linkage;
   the clamp link having means to force the forward end of the main body and the bead breaking feet toward the anchor foot and cause the bead breaking feet to enter between the tire side wall and the rim flange;
   the bead breaking feet including at least one backup foot fixed with respect to the main body to forcibly engage the rim flange and at least one pusher foot movable forward from the main body and out of the transverse plane to force the tire side wall and bead away from the rim flange;
   and means to drive the pusher foot forward.

2. Apparatus as claimed in claim 1; wherein
   the second end of the compression link is provided with a plurality of spaced engaging means for selective connection to the pivot means on the main body to vary the shape of the triangular linkage for accommodating various sizes of wheels and tires.

3. Apparatus as claimed in claim 1; wherein
   the pivot means on the main body comprises at least one rod secured thereto and extending laterally beyond its side walls;
   the compression link comprises two laterally spaced bars pivotally connected at their first ends to the clamp link;
   the second ends of the bars are provided with axially spaced recesses to selectively receive the ends of the pivot rod on the main body;
   and guard means are arranged in opposed spaced relation to the recesses to prevent disengagement of the rod from the bars.

4. Apparatus as claimed in claim 1; wherein
   a backup foot extends forwardly and laterally from each side of the forward end of the main body to define a gap between them;
   and the pusher foot is located in the gap for fore and aft movement.

5. Apparatus as claimed in claim 1; wherein
   a pressure pad is provided on the side of the main body opposite to the direction of extension of the bead breaking feet;
   a clamping foot is provided to engage the pressure pad;
   a drive means is connected to the second end of the clamp link and to the clamping foot to force it against the pressure pad and move the bead breaking feet toward the anchor foot.

6. Apparatus as claimed in claim 5; wherein
   the clamp link slidingly engages the opposite sides of the main body;
   and axially spaced guide bosses are provided on opposite sides of the main body fore and aft of the clamp link to maintain it in proper relation to the main body.

7. Apparatus as claimed in claim 6; wherein the clamp link comprises two elongate bars with an anchor foot at the first end of each bar;
and one bar passes on each side of the main body.

8. Apparatus as claimed in claim 5; wherein
a clevis block is pivotally connected to the second end of the clamp link;
and the drive means is connected to the clevis block.

9. Apparatus as claimed in claim 8; wherein
the clevis block is provided with an internally threaded passage;
the drive means comprises an externally threaded shaft mounted in the passage;
and the clamping foot is mounted on the end of the shaft adjacent to the pressure pad.

10. Apparatus as claimed in claim 5; wherein
the second end of the clamp link is provided with laterally spaced end portions formed with bayonet slots;
the drive means comprises a hydraulic power cylinder having laterally extending bayonet pins to engage in the bayonet slots and define a clevis mounting;
and a piston rod is extensible from the cylinder with its outer end serving as the clamping foot.

11. Apparatus as claimed in claim 1; wherein
the main body has an axial passage extending therethrough;
a carrier member is axially slidable in the passage to extend out from the forward end of the main body;
the pusher foot is fixedly connected to the forward end of the carrier member;
and the drive means is connected to the aft end of the main body and to the aft end of the carrier member to extend and retract it.

12. Apparatus as claimed in claim 11; wherein
the carrier member is provided with an axial threaded bore;
and the drive means comprises a threaded shaft which is axially fixed and rotatably mounted in the aft portion of the main body in engagement with the hole in the carrier member to extend and retract the latter.

13. Apparatus as claimed in claim 11; wherein
the carrier member is formed at its aft end with a hollow axial boss provided with bayonet slots;
the aft end of the main body is provided with bayonet slots;
and the drive means comprises a hydraulic power cylinder provided at its forward end with bayonet pins to engage the bayonet slots in the main body;
a piston rod being extensible from the cylinder and provided at its forward end with bayonet pins to engage the bayonet slots in the boss to extend and retract the carrier member.

14. Tire bead bead breaking apparatus for use with an earth mover wheel having laterally spaced circular rim portions including exposed peripheral inner faces and peripheral bead seats and radially outwardly extending rim flanges to receive a tire having beads secured on the bead seats and annular side walls seating against the rim flanges, comprising:
an elongate breaker unit having a main body provided at its forward end with a plurality of bead breaking feet and at its aft end with pivot means;
an elongate compression link pivotally connected at its second, aft, end to the pivot means;
and an elongate clamp link pivotally connected at its first end to the first, forward, end of the compression link and having an intermediate portion slidably crossing an intermediate portion of the breaker unit to define a triangular linkage;
an anchor foot extending from the first end of one of the links to engage a rim inner face;
means on the clamp link engaging an intermediate portion of the breaker unit to forcibly swing the breaker unit about its pivotal connection to the compression link and drive the bead breaking feet toward the anchor foot and cause them to enter between the tire side wall and the rim flange;
and means to force one of the bead breaking feet in a direction away from the breaker unit to force a portion of the tire side wall and bead away from the rim flange.

* * * * *

UNITED STATES PATENT OFFICE
CERTIFICATE OF CORRECTION

Patent No. 3,771,580            Dated  November 13, 1973

Inventor(s)  Charles Earl Branick

It is certified that error appears in the above-identified patent and that said Letters Patent are hereby corrected as shown below:

In the Abstract:

Line 4, after "link" insert -- has a first end pivoted to the forward end of the compression link --.

Column 1, line 22, after "since" insert -- such --.

Column 8, line 13, after "bead" omit -- bead --.

Signed and sealed this 16th day of April 1974.

(SEAL)
Attest:

EDWARD M. FLETCHER, JR.
Attesting Officer

C. MARSHALL DANN
Commissioner of Patents